(12) United States Patent
Lu

(10) Patent No.: US 11,650,418 B2
(45) Date of Patent: May 16, 2023

(54) OPTICAL FIELD DISPLAY SYSTEM

(71) Applicant: FAITH BILLION TECHNOLOGY DEVELOPMENT LIMITED, Wanchai (HK)

(72) Inventor: Zengxiang Lu, Hong Kong (HK)

(73) Assignee: Faith Billion Technology Development Limited, Hong Kong (HK)

( * ) Notice: Subject to any disclaimer, the term of this patent is extended or adjusted under 35 U.S.C. 154(b) by 0 days.

(21) Appl. No.: 17/429,556

(22) PCT Filed: Sep. 19, 2019

(86) PCT No.: PCT/CN2019/106707
§ 371 (c)(1),
(2) Date: Aug. 9, 2021

(87) PCT Pub. No.: WO2020/237927
PCT Pub. Date: Dec. 3, 2020

(65) Prior Publication Data
US 2022/0334385 A1    Oct. 20, 2022

(30) Foreign Application Priority Data

May 24, 2019   (CN) .......................... 201910438785.3

(51) Int. Cl.
*G09G 3/00*       (2006.01)
*G02B 27/00*      (2006.01)
*G02B 30/54*      (2020.01)

(52) U.S. Cl.
CPC ......... *G02B 27/0093* (2013.01); *G02B 30/54* (2020.01); *G09G 3/005* (2013.01)

(58) Field of Classification Search
CPC .... G02B 27/0093; G02B 30/54; G02B 27/22; G09G 3/005; G09G 2300/0426;
(Continued)

(56) References Cited

U.S. PATENT DOCUMENTS 4,089,597 A * 5/1978 Collender .............. G03B 35/00
352/53
7,961,182 B2 * 6/2011 Tachi ..................... G03B 35/18
348/42

(Continued)

FOREIGN PATENT DOCUMENTS

CN   101762881 A   6/2010
CN   102576156 A   7/2012
(Continued)

OTHER PUBLICATIONS

China Intellectual Property Office, Office Action dated May 13, 2020, in CN 201910438785.3.
(Continued)

*Primary Examiner* — Bryan Earles
(74) *Attorney, Agent, or Firm* — Faegre Drinker Biddle & Reath LLP

(57) ABSTRACT

Embodiments of the present disclosure describe a light-field display system including a rotatable display screen subsystem, a display screen positioning apparatus, an eye tracking subsystem, and a computer. The rotatable display screen subsystem includes a lamp pole. The lamp pole includes a lamp panel. The lamp panel includes a vector pixel array.

(Continued)

The display screen positioning apparatus includes a plurality of lasers and a photosensor. The computer device is connected to the rotatable display screen subsystem and the eye tracking subsystem. The lamp panel controller is configured to determine a position of the lamp panel according to sensed data of the display screen positioning apparatus. Each vector pixel on the lamp panel displays display content in a display direction to achieve 3D image display.

20 Claims, 10 Drawing Sheets

(58) Field of Classification Search
CPC ........... G09G 3/008; G09F 19/12; G09F 9/37; G09F 9/302; H04N 13/302; H04N 13/383
See application file for complete search history.

(56) References Cited

U.S. PATENT DOCUMENTS

| | | | | |
|---|---|---|---|---|
| 11,006,090 | B2* | 5/2021 | Howell | H04N 13/376 |
| 2005/0231499 | A1* | 10/2005 | Wang | G09G 3/005 |
| | | | | 345/207 |
| 2007/0103545 | A1 | 5/2007 | Listig et al. | |
| 2008/0043014 | A1 | 2/2008 | Tachi et al. | |
| 2008/0074346 | A1* | 3/2008 | Petrich | H04N 13/393 |
| | | | | 345/30 |
| 2013/0328777 | A1* | 12/2013 | Johnson | H04N 13/356 |
| | | | | 345/1.3 |

FOREIGN PATENT DOCUMENTS

| | | |
|---|---|---|
| CN | 105700162 A | 6/2016 |
| GB | 2432707 A | 5/2007 |
| JP | 2001-154614 A | 6/2001 |
| JP | 2007101970 A | 4/2007 |
| JP | 2007-226013 A | 9/2007 |
| JP | 2008-078846 A | 4/2008 |
| JP | 2010-113161 A | 5/2010 |
| JP | 2019-512181 A | 5/2019 |
| WO | WO 2017/164506 | 9/2017 |

OTHER PUBLICATIONS

Patent Cooperative Treaty, International Search Report and Written Opinion, dated Feb. 21, 2020, in PCT/CN2019/106707.
European Patent Office, Extended European Search Report dated Jan. 20, 2023, in EP 19930783.6.
Japanese Patent Office, Office Action dated Dec. 13, 2022, in JP 2021-569040.

* cited by examiner

OPTICAL FIELD DISPLAY SYSTEM

The present disclosure is a national phase application under 35 U.S.C. § 371 of PCT Application No. PCT/CN2019/106707, filed Sep. 19, 2019, which claims priority to Chinese Patent Application No. 201910438785.3, filed with the China National Intellectual Property Administration on May 24, 2019, both of the above applications are incorporated herein by reference in their entirety.

TECHNICAL FIELD

Embodiments of the present disclosure relate to three-dimensional (3D) display technology, such as a light-field display system.

BACKGROUND

Glasses-free 3D display technology allow users to get rid of the shackles of 3D glasses and directly observe 3D images with the naked eye. With the development of display technologies, glasses-free 3D display technology mainly includes multi-viewpoint display technology, volumetric display technology, directional backlight display technology, integrated imaging display technology, multi-layer display technology, and/or holographic 3D display technology.

Multi-viewpoint display technology was developed to resolve the problem of having a excessively small viewing angle for every two viewpoints. Multi-viewpoint display technology operates to increase a quantity of viewpoints. However, a larger quantity of viewpoints indicates more occupied resources, lower resolution, and a more obvious vergence accommodation conflict (VAC) effect. In addition, producing a program, either an animation or a video, for multi-viewpoint 3D display faces the problems of high technical difficulty and high costs. Consequently, multi-viewpoint display technology has a limited application range.

Volumetric display technology uses a rotatable screen or a plurality of screens evenly distributed in space to sequentially lighten pixels at different times and different spatial positions. Because of the persistence of vision effects of the eyes, a 3D image can be perceived. However, the spatial resolution of a 3D image screen in volumetric display technology is insufficient and thus has a limited application range.

Directional backlight technology uses a specially designed structure on a light guide plate to spread light rays in different directions and form parallax illumination. This technology relies on a liquid crystal display screen and a directional backlight source. However, it is difficult to achieve large-format graphic illumination and display, which results in serious VAC effects.

Multi-layer display technology is a spatial planar-viewing angle light field display technology. The basic principle is to display video images with differences on different display screens by arranging two or more display screens in one display. The images have specific depth information and achieves 3D display through a synthesis effect of the two or more display screens after processing the images one by one. However, an imaging device for achieving multi-layer display has an excessively large volume, lower brightness, and high costs.

Integrated imaging is a glasses-free 3D display technology that records and reproduces a real 3D scene by using a lens array according to the principles of light reversibility. However, the positions of image points for this type of imaging are undiversified and a depth of field is relatively small.

Holographic 3D display technology uses two beams of coherent light that interfere with each other to form a complex holographic light field. One of the beams is reflected by a surface of a real object and carries intensity and phase information of the surface of the object. The other of the beams does not carry any information. The holographic light field includes information such as brightness and a depth of field of the surface of the object to reproduce information of the light field. This information is recorded and used to reproduce the intensity and phase of light so as to provide the needed depth perception information to the human visual system. In this manner, various people can simultaneously view the same 3D image, thereby breaking a limitation imposed by glasses-free 3D display technology on a quantity of viewers. However, holographic 3D display technology has a small viewing angle and thus has a limited application range.

In conclusion, none of the existing glasses-free 3D display technologies possess all the advantages such as a large depth of field, no VAC effects, an obvious motion parallax, a broad viewing angle range, high brightness, and capable of supporting a plurality of viewers at the same time.

SUMMARY

Embodiments of the present disclosure provide a light-field display system to allow various viewers to view a glasses-free 3D image at the same time. The viewers can see different 3D image content at different viewing positions. This improves resolution and a depth of field of the glasses-free 3D image and broadens a viewing angle range for the viewers.

Embodiments of the present disclosure provide a light-field display system that includes a rotatable display screen subsystem, a display screen positioning apparatus, an eye tracking subsystem, and a computer device.

The rotatable display screen subsystem includes a lamp pole and a controller. The lamp pole includes a first preset quantity of lamp panels, with each lamp panel having a vector pixel array. The vector pixel array includes a real image vector pixel and a virtual image vector pixel.

The display screen positioning apparatus includes a plurality of lasers and a photosensor. The plurality of lasers are disposed at a plurality of preset positions on a periphery of the rotatable display screen subsystem and the photosensor is disposed on the controller. The eye tracking subsystem includes an eye tracking camera and a position calculation unit. The eye tracking camera is configured to obtain image information. The position calculation unit is configured to determine spatial positions and line-of-sight directions of two eyes of a viewer according to the image information obtained by the eye tracking camera.

The computer device is connected to the rotatable display screen subsystem and the eye tracking subsystem. The computer device is configured to obtain the spatial positions and the line-of-sight directions of the two eyes of the viewer. The computer device is also configured to generate 3D display data displayed to each eye of the viewer according to the spatial positions of the two eyes of the viewer. The computer device is further configured to split the 3D display data according to an arrangement of the lamp panels and send the spatial positions and the line-of-sight directions of the two eyes of the viewer along with the split 3D display data to the rotatable display screen subsystem in response to a request from the controller.

The controller is configured to determine a position of the lamp panel controlled by the controller according to sensed data of the display screen positioning apparatus. The controller is also configured to obtain, from the computer device, 3D display data corresponding to the position of the lamp panel controlled by the controller and the spatial positions and the line-of-sight directions of the two eyes of the viewer. The controller is further configured to calculate display content and a display direction of each vector pixel on the lamp panel controlled by the controller according to the obtained 3D display data and the spatial positions and the line-of-sight directions of the two eyes of the viewer. Moreover, the controller is configured to drive each vector pixel on the lamp panel controlled by the controller to display the display content in the display direction to achieve 3D image display.

DETAILED DESCRIPTION

The present disclosure is described in detail below with reference to the accompanying drawings and embodiments. It may be understood that specific embodiments described herein are only used to explain the present disclosure, but not to limit the present disclosure. In addition, it should be noted that, for ease of description, the accompanying drawings only show parts relevant to the present disclosure rather than the entire structure.

Figure 1:
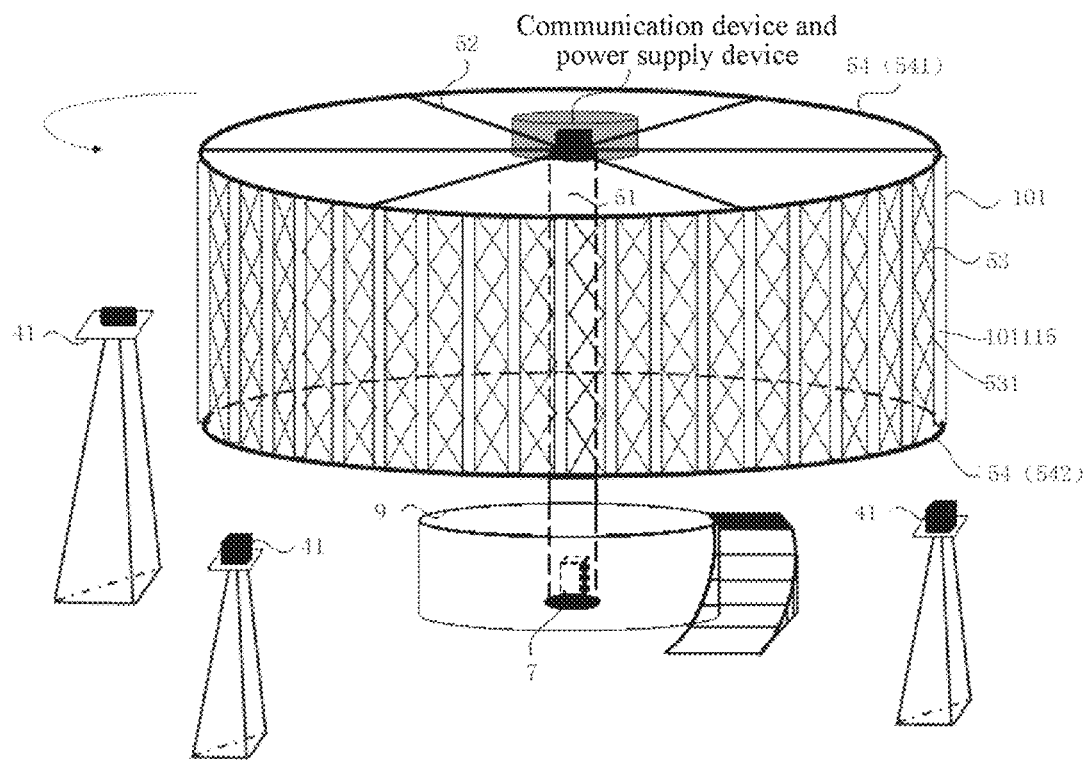
FIG. 1 is a schematic structural diagram of a light-field display system according to an embodiment of the present disclosure.

FIG. 1 is a schematic structural diagram of a light-field display system according to an embodiment of the present disclosure. This embodiment is applicable to achieving glasses-free 3D image display. As shown in FIG. 1, a structure of the light-field display system specifically includes a rotatable display screen subsystem 1, a display screen positioning apparatus, an eye tracking subsystem, a communication subsystem, and a computer device 7. The rotatable display screen subsystem 1 is a rotatable structure constructed from a lamp pole 101, a controller 6, a lamp pole fixing apparatus, and a motor. The lamp pole 101 includes a first preset quantity of lamp panels 10111. Each lamp panel 10111 includes a vector pixel array and a vector pixel drive circuit. The vector pixel array includes a real image vector pixel 101111 and a virtual image vector pixel 101112. It may be understood that both the real image vector pixel 101111 and the virtual image vector pixel 101112 are vector pixels.

In one implementation, each vector pixel in the vector pixel array is a light source formed by integrating and packaging a dense light-emitting device 101113 and an optical component 101114. The dense light-emitting device 101113 includes a second preset quantity of micro light-emitting diode arrays or organic light-emitting diode arrays. The vector pixel emits a narrow light beam from a point light source, which can be approximately regarded as a light source emitting light from one point in relation to a relatively large display scale. The vector pixel drive circuit is connected to each light-emitting device in the dense light-emitting device array and is controlled by the controller 6. According to a quantity of dense light-emitting devices 101113, projecting light beams in 100 or more distinguishable directions and emitting light beams simultaneously in two or more directions are supported. The light beams emitted by the dense light-emitting devices 101113 support at least 16 levels of adjustment in brightness. Under the control of the controller 6 of the lamp panel 10111, the vector pixel may cause the dense light-emitting device 101113 to pass through a group of optical imaging apparatuses and form light having characteristics such as high brightness, small size, and fast response.

Further, a spatial position of an image point of a subpixel (e.g., the light-emitting device) of the vector pixel is adjusted by adjusting a distance between the dense light-emitting device 101113 and the optical component 101114. According to a positional relationship between the image point of the subpixel and the optical component, vector pixels can be divided into three categories: a virtual image-mode vector pixel, a real image-mode vector pixel, and an image point-free vector pixel. When the distance between the dense light-emitting device 101113 and the optical component 101114 causes an image of the dense light-emitting device 101113 to be a real image, the vector pixel is a real image vector pixel 101111. When the distance between the dense light-emitting device 101113 and the optical component 101114 causes the image of the dense light-emitting device 101113 to be a virtual image, the vector pixel is a virtual image vector pixel 101112. When the distance between the dense light-emitting device 101113 and the optical component 101114 prevents light emitted by the dense light-emitting device 101113 from converging to form an image, the vector pixel is an image point-free vector pixel.

Figure 2:
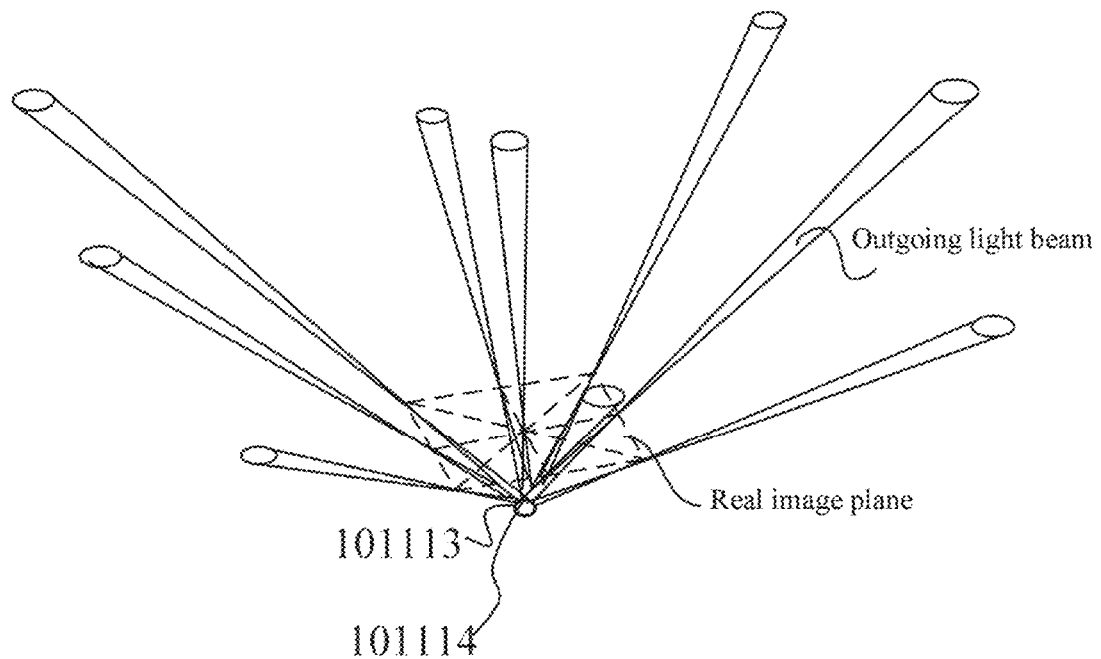
FIG. 2 is a schematic diagram of a real image vector pixel according to an embodiment of the present disclosure.
Figure 3:
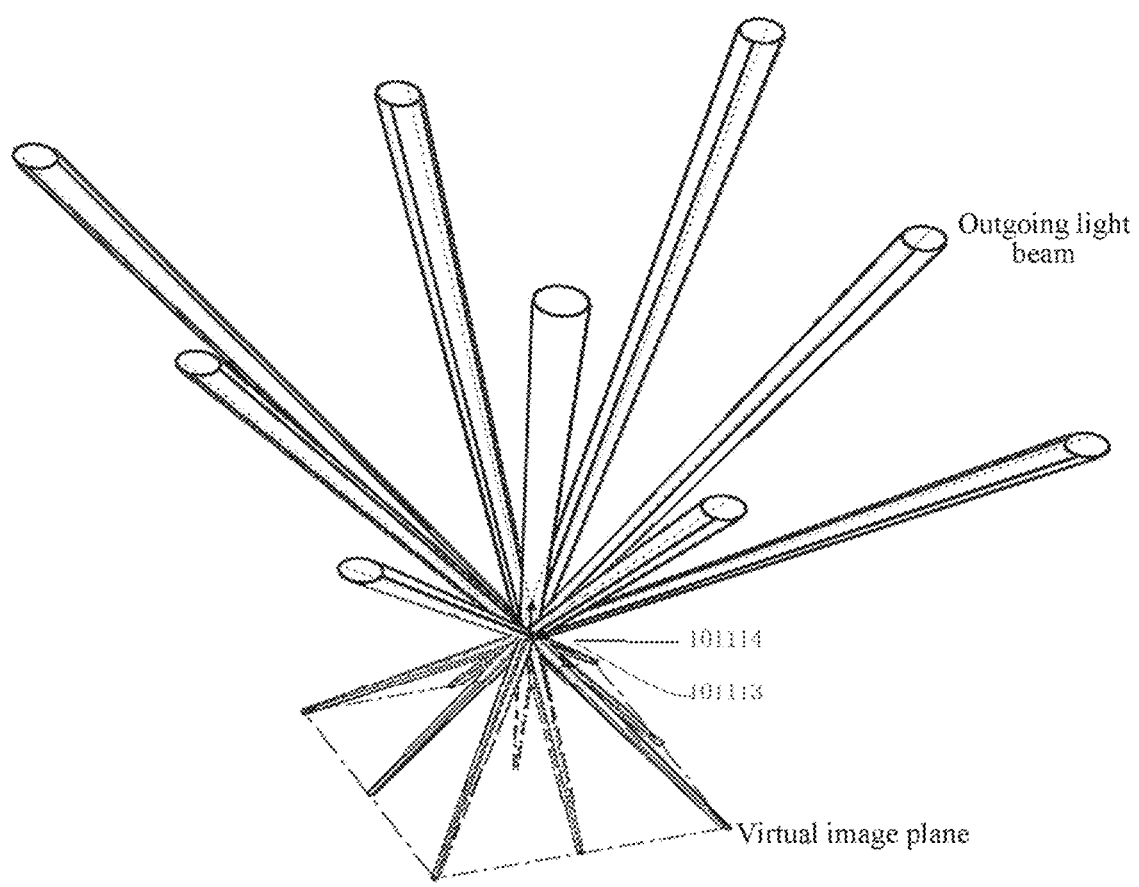
FIG. 3 is a schematic diagram of a virtual image vector pixel according to an embodiment of the present disclosure.

FIG. 2 shows a schematic diagram of light emissions of the real image vector pixel 101111. FIG. 3 shows a schematic diagram of light emissions of the virtual image vector pixel 101112. From a comparison between FIG. 2 and FIG. 3, it can be seen that the imaging planes of the real image vector pixel 101111 and the virtual image vector pixel 101112 are different planes, with the imaging plane of the real image vector pixel 101111 and the imaging plane of the virtual image vector pixel 101112 being respectively on two sides of a vector pixel. In outgoing light beams of the real image vector pixel 101111 and the virtual image vector pixel 101112, different outgoing light beams are emitted by different subpixels. A subpixel refers to a light-emitting device in the dense light-emitting device 101113. In the real image vector pixel 101111 or the virtual image vector pixel 101112, each light-emitting device in the dense light-emitting device 101113 can be individually controlled by the controller 6. Therefore, different patterns and visual effects are formed by controlling different subpixels to emit light rays of different intensities.

Figure 4:
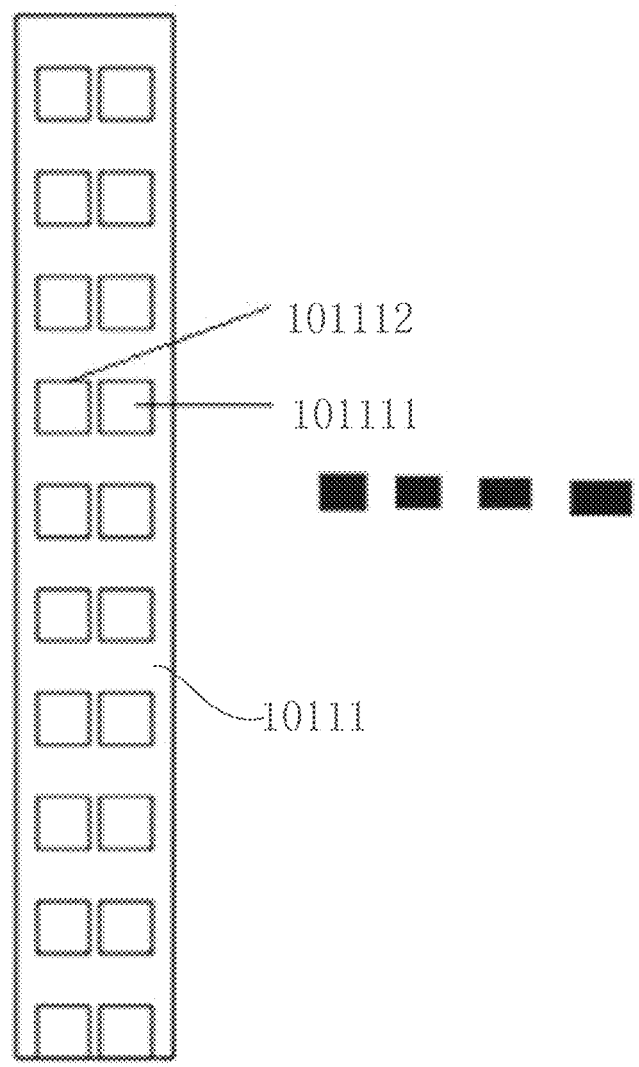
FIG. 4 is a schematic diagram of an arrangement of a vector pixel array in a lamp panel according to an embodiment of the present disclosure.

In one implementation, the real image vector pixels 101111 and virtual image vector pixels 101112 in each vector pixel array are alternately arranged on the lamp panel 10111 in a unit of column. As shown in FIG. 4, which is a schematic diagram of an arrangement of a vector pixel array of the lamp panel 10111, the vector pixel array includes a column of real image vector pixels 101111 and a column of virtual image vector pixels 101112. When a light-field display system is built, one lamp panel 10111 needs to include at least one column of real image vector pixels 101111 and one column of virtual image vector pixels 101112.

In another implementation, M1 columns of real image vector pixels 101111 and M2 columns of virtual image vector pixels 101112 may be alternately arranged, where M1 and M2 are positive integers. At least one column of image point-free vector pixels can be further included. It should be noted that imaging planes of vector pixels in a same column are the same plane. On the other hand, imaging planes of vector pixels of a same type in different columns may not be in the same plane, which can be specifically achieved by adjusting a distance between the optical component 101114 and the dense light-emitting device 101113 or selecting optical components 101114 with different imaging focal lengths. In this manner, imaging on a plurality of different imaging planes can be achieved so that the display screen has a better depth of field on both sides.

Figure 5:
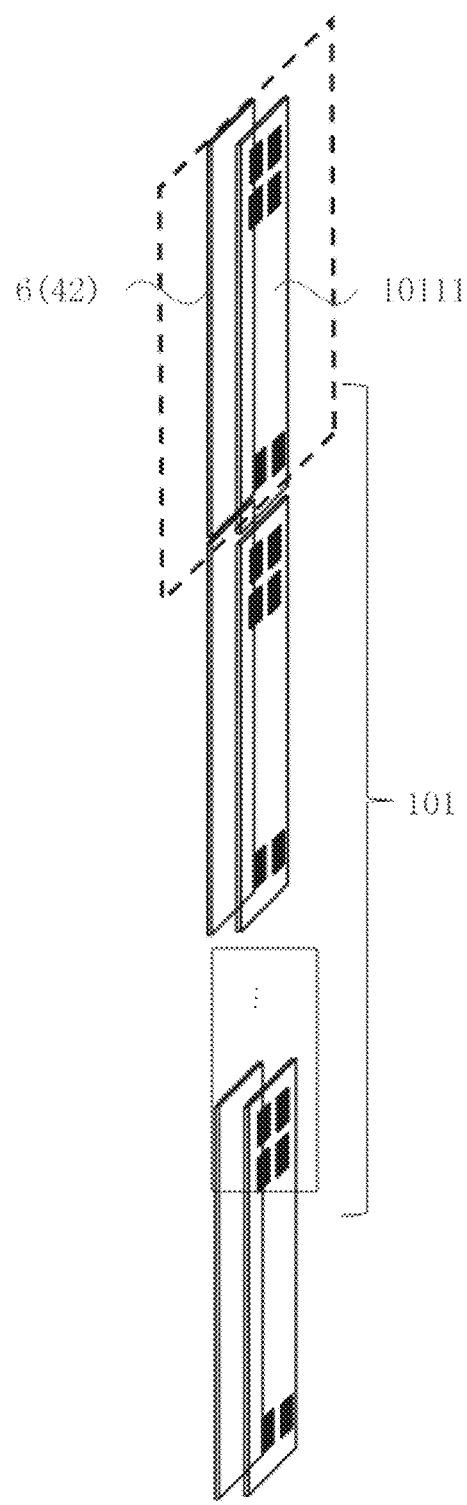
FIG. 5 is a schematic diagram of a lamp pole according to an embodiment of the present disclosure.

In one implementation, each lamp panel 10111 and a vector pixel drive circuit board are both connected and fixed to a diagonal brace 53. A plurality of lamp panels 10111 can be arranged in a column and combined into a lamp pole 101 through connections and combinations of a plurality of diagonal braces 53. Referring to a lamp pole 101 formed by combining n lamp panels 10111 (third quantity) as shown in FIG. 5, a lamp panel layout template may be used to perform lamp panel layout piece by piece. This achieves high-precision alignment between the lamp panels 10111. A flexible and adjustable design of the diagonal brace 53 also allows the display screen to be flexible and mechanically uniform. A plurality of lamp poles 101 are fixed by a fixing ring 54 (e.g., an upper round steel hoop 541 and a lower round steel hoop 542), a center shaft, and a cantilever 52 to enclose a cylindrical surface as shown in FIG. 1. The cylindrical surface can be driven by a motor to rotate at a preset speed and display a 3D image during rotation. The cylindrical surface is a rotatable display screen and cannot display a screen in a static state.

In one implementation, a plurality of first fixing points 101115 are disposed on each lamp panel 10111. A same quantity of second fixing points 531 to that of the first fixing points 101115 on the lamp panel 10111 are disposed on each diagonal brace 53. Each lamp panel 10111 and the diagonal brace 53 are fixed through the corresponding first fixing points 101115 and second fixing points 531. In the rotatable display screen subsystem 1, for each lamp pole 101, all lamp panels 10111 are placed in a same orientation and all the lamp panels 10111 have a consistent arrangement of a vector pixel array. Layout directions of the diagonal braces 53 may be inconsistent, but all methods of performing lamp panel layout by using X-shaped diagonal braces are within the scope of the present disclosure.

The plurality of lamp poles 101 are evenly arranged and fixed between the upper round steel hoop 541 and the lower round steel hoop 542. The rotatable display screen subsystem 1 is driven by the motor to rotate at a preset rotation frequency. In a unit area by which the rotatable screen rotates, an area of the lamp panels 10111 is the same as an area of the diagonal braces 53 so that a screen can have more uniform brightness during display.

It should be noted that the plurality of lamp poles 101 are evenly arranged and fixed between the upper round steel hoop 541 and the lower round steel hoop 542. This means that each lamp pole 101 is fixed between the upper round steel hoop 541 and the lower round steel hoop 542, and the plurality of lamp poles 101 are evenly arranged along a circumferential direction of at least one of the upper round steel hoop 541 and the lower round steel hoop 542.

Figure 6:
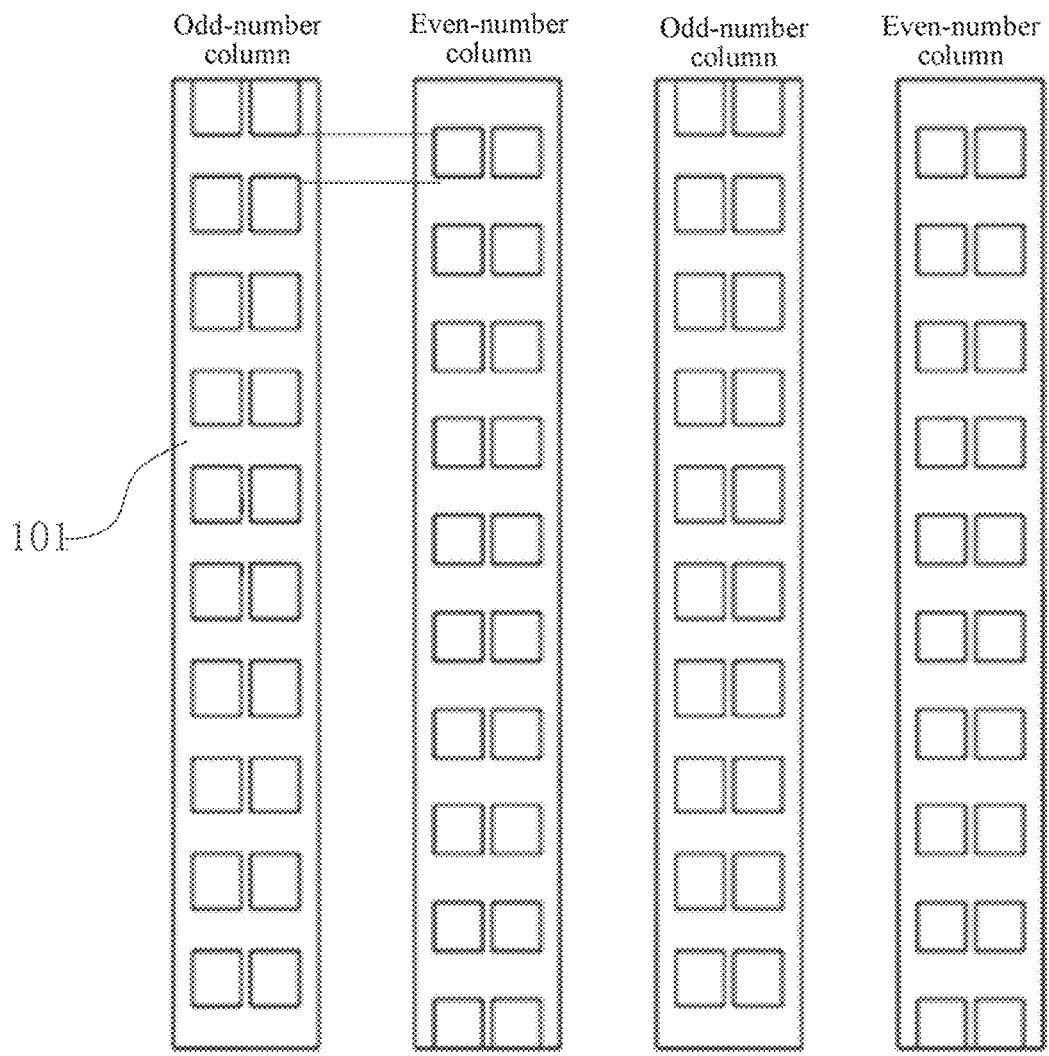
FIG. 6 is a schematic diagram of an arrangement of vector pixels in different columns of lamp poles according to an embodiment of the present disclosure.

In one implementation, vector pixels in odd-number columns of lamp poles 101 and vector pixels in even-number columns of lamp poles 101 are alternately arranged in the rotatable display screen subsystem 1. FIG. 6 shows a schematic diagram of odd-number columns of lamp poles and even-number columns of lamp poles. In this embodiment, the lamp poles 101 are placed vertically and the first rotation center shaft 51 is a vertical shaft. When the lamp poles 101 rotate, a cylindrical display screen is formed. In the vertically arranged lamp poles 101, any lamp pole 101 is used as a first lamp pole 101 serving as a lamp pole 101 in an odd-number column. The remaining lamp poles 101 are automatically divided into lamp poles 101 in odd-number columns and lamp poles 101 in even-number columns. Vector pixels of the odd-number columns of lamp poles 101 and vector pixels of the even-number columns of lamp poles 101 are arranged alternately. In this manner, a quantity of vector pixels in a single column of lamp poles 101 is reduced by half without reducing displayed information so as to make the screen display smoother while satisfying viewing demands. For example, screens are displayed at 40 frames/s. When the lamp poles 101 are divided into odd-number columns of lamp poles 101 and even-number columns of lamp poles for rotatable display (which is equivalent to performing interlaced scanning for display), a refresh rate is increased to 80 frames/s to resist screen flickering.

In the embodiment of FIG. 6, either horizontally or vertically, the vector pixels can be arranged in high density and an arrangement density of the vector pixels can be less than a width of the diaphragm 1011141 of the optical component. For example, a gap may be 0.5 times the width of the diaphragm 1011141. In a longitudinal direction of the lamp pole 101, a column-wise high-pixel density arrangement can be achieved by densely arranging the lamp poles 101 alternately. In a horizontal direction, because of rotation of the lamp poles 101 and a visual persistence effect, a horizontal high-pixel density arrangement can be achieved by controlling a lightening time of a pixel. A shorter pixel enlightening time indicates higher resolution of a displayed screen. Therefore, a pixel gap may be less than a size of the diaphragm 1011141 of the optical component of the vector pixel.

Figure 7:
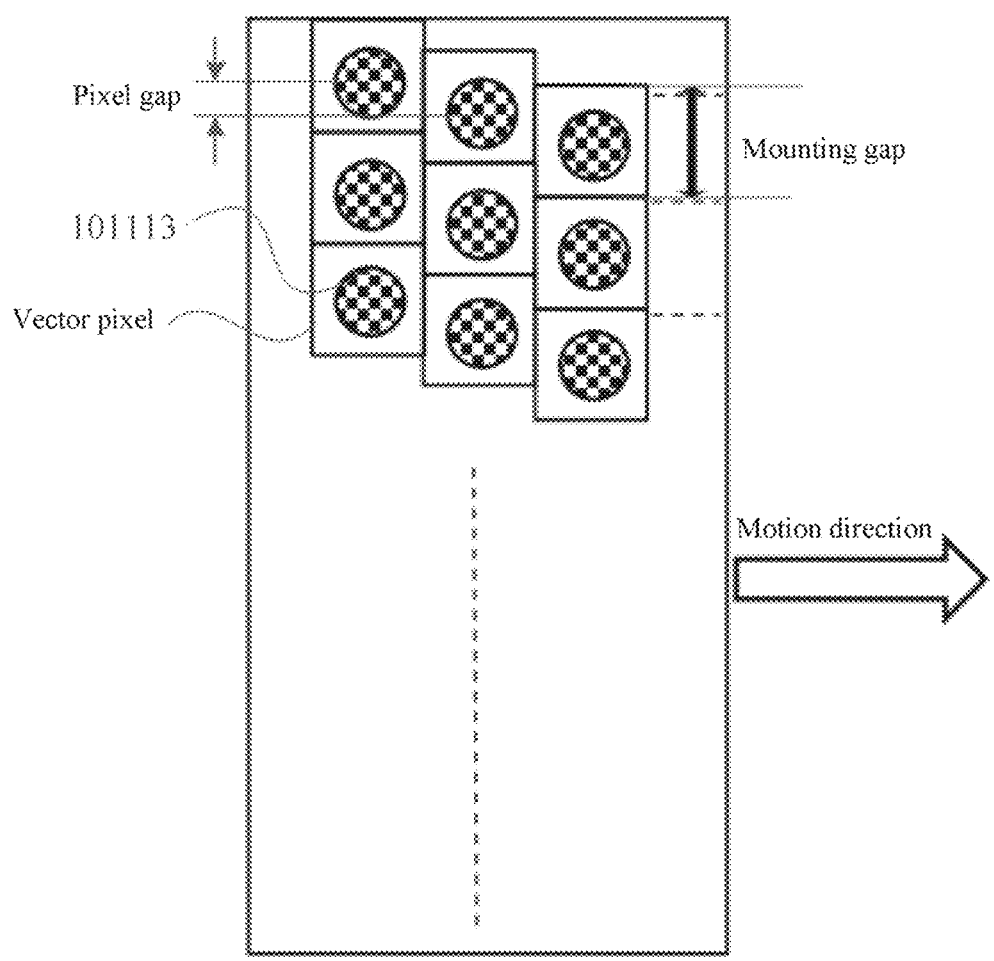
FIG. 7 is a schematic diagram of an arrangement of a vector pixel array in a lamp panel according to an embodiment of the present disclosure.
Figure 8:
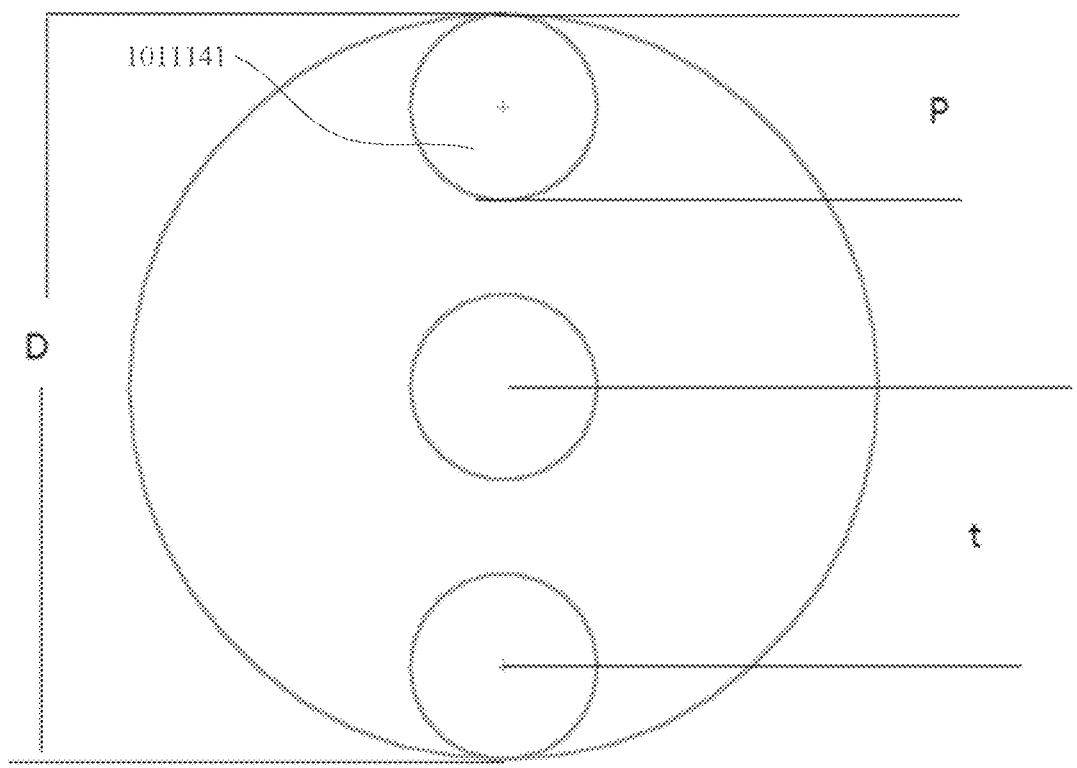
FIG. 8 is a schematic diagram of a relationship between a pupil diameter and a diaphragm diameter according to an embodiment of the present disclosure.

FIG. 7 shows an arrangement of vector pixels in a lamp panel 10111 that can be used to arrange all columns of vector pixels. The columns of vector pixels can be arranged alternately to ensure that a smaller pixel gap can still be obtained while a mounting gap is relatively large. to thereby improve the resolution. A smaller gap between pixels indicates higher display resolution and a clearer displayed image. Due to a limitation of a current production process, costs of vector pixels are relatively high while sizes of vector pixels are relatively large. To reduce costs while ensuring a viewing effect, vector pixels should be arranged such that when the vector pixels are watched, all parallel light rays emitted by at least two vector pixels toward a direction of a pupil can be incident on the pupil at the same time. A maximum gap of the vector pixel arrangement needs to meet $(D-p)/2$, where D is a pupil diameter, p is a diameter of the diaphragm 1011141, and a smaller gap indicates better effect. The diaphragm 1011141 is an element that limits light beams in the optical component 101114. In FIG. 8, D is a pupil diameter of a person, p is a diaphragm diameter, and t is a spacing between diaphragms. For example, three diaphragms are shown in FIG. 8. In a use process, a quantity of diaphragms 1011141 can be disposed according to requirements.

In one implementation, the display screen positioning apparatus in the light-field display system includes a plurality of lasers 41 and a photosensor 42. The plurality of lasers 41 are disposed at a plurality of preset positions on a periphery of the rotatable display screen subsystem 1, and the photosensor 42 is disposed on each controller 6. When the platform rotates steadily, the photosensor 42 on each controller 6 receives laser signals and calculates specific position information of a current lamp panel 10111 by using a time difference at which laser scans the lamp panels 10111. After a position of one lamp panel 10111 is determined, position information of other lamp panels 10111 can be determined according to relative position information between the lamp panel 10111 and the other lamp panels 10111.

Figure 9:
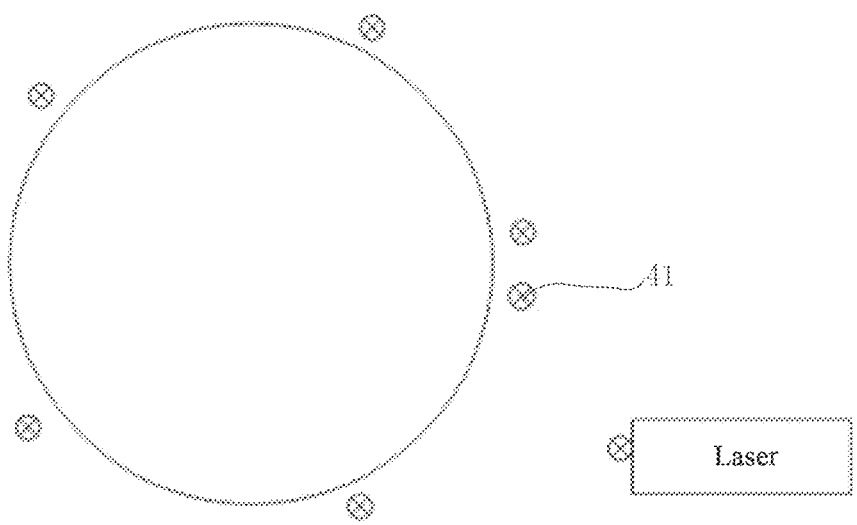
FIG. 9 is a schematic diagram of an arrangement of laser modules on a periphery of a rotatable display screen according to an embodiment of the present disclosure.

In one implementation, the plurality of lasers 41 are arranged on the periphery of the rotatable display screen and are arranged in a specific uneven manner for calibrating positions of the lamp panels. FIG. 9 shows an arrangement of the lasers 41.

In one implementation, the eye tracking subsystem in the light-field display system is responsible for feeding back a viewpoint position of a person to the controller 6 to ensure that the system can accurately drive corresponding display pixels. The eye tracking subsystem includes an eye tracking camera and a position calculation unit. The eye tracking camera is configured to obtain image information. The position calculation unit is configured to determine spatial positions and line-of-sight directions of at least one viewer according to the image information obtained by the eye tracking camera. Two-eye 3D position information of a plurality of viewers can be acquired by a plurality of optical cameras in real time. A reflected image on the cornea and pupil of an eye of a user is generated by using a near-infrared light source. The image reflected by the cornea and pupil of the eye is then acquired by using an image sensor. Finally, a spatial position of the eye is calculated by using an image processing algorithm.

In one implementation, positions of the eye tracking camera and the position calculation unit can be set according to requirements of eye tracking. For example, the eye tracking camera and the position calculation unit can be mounted at positions such as an outer bottom edge of the display screen and an inner top of the display screen so that the eye tracking camera and the position calculation unit may not rotate with the display screen. In one implementation, the eye tracking subsystem includes a first-level camera and a second-level camera, where the first-level camera and the second-level camera are connected to each other. The first-level camera is configured to acquire a facial image of a viewer, while the second-level camera is configured to acquire an image of two eyes of the viewer. In addition, a server is used for task assignment and tracking scheduling. The server is also used to connect the first-level camera and the second-level camera to form the entire system.

In one implementation, the computer device 7 in the light-field display system is connected to the rotatable display screen subsystem 1 and the eye tracking subsystem. The computer device 7 is configured to obtain the spatial positions and the line-of-sight directions of the two eyes of the at least one viewer from the eye tracking subsystem. Also, the computer device 7 is configured to generate 3D display data to be displayed to each eye of the at least one viewer at the spatial position according to the spatial positions of the two eyes of the at least one viewer. Further, the computer device 7 is configured to split and store the 3D display data according to an arrangement of the lamp panels 10111, and to send the spatial positions and the line-of-sight directions of the two eyes of the at least one viewer along with the split 3D display data to the rotatable display screen subsystem 1 in response to a request from the controller 6. Splitting the 3D display data may include decomposing a video by frame into a series of pictures (a format of the picture may be .jpg or .bmp), evenly splitting the pictures into small blocks according to column-wise resolution of a displayed screen and a quantity of columns of mounted lamp panels 10111, and storing the small blocks in a corresponding format. For example, if the resolution of an image is 2000*8200 (height*width), and a quantity of columns of lamp panels 10111 is 82, then a size of 3D display data of each block is 2000*100. A block file of the entire video is stored and named as "video directory-block directory-block file," for example. According to a characteristic of a relative position of each column of lamp panels 10111 (e.g., the lamp pole 101 is fixed with consistent rotation movement), each controller 6 generates synchronization signal data according to a quantity of turns by which the rotatable display screen currently rotates and a current position of the rotatable display screen. Each controller 6 also makes a frame time in a video correspond to the quantity of turns and position data according to a rotation speed. A controller 6 of each column buffers corresponding to-be-displayed block picture files in advance according to the current position.

In one implementation, each controller 6 is configured to determine a position of each lamp panel 10111 controlled by the controller 6 according to sensed data of the display screen positioning apparatus. Each controller 6 is also configured to obtain, from the computer device 7, 3D display data corresponding to a position of each lamp panel 10111 controlled by the controller 6 and the spatial positions and the line-of-sight directions of the two eyes of the at least one viewer. Each controller 6 is further configured to calculate display content and a display direction of each vector pixel on the lamp panel 10111 controlled by the controller 6 according to the obtained 3D display data and the spatial positions and the line-of-sight directions of the two eyes of the at least one viewer. Moreover, each controller 6 is configured to drive each vector pixel on the lamp panel 10111 controlled by the controller 6 to display the display content in the display direction and achieve 3D image display.

Figure 10:
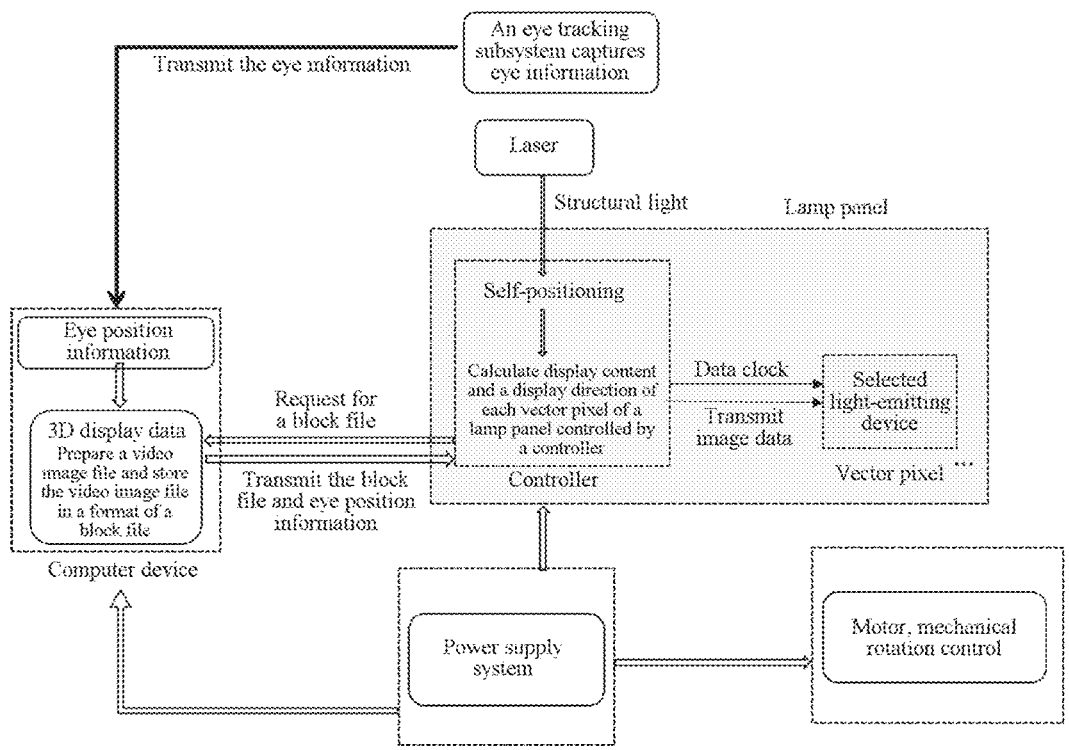
FIG. 10 is a schematic diagram of interaction between a controller and another functional structure in a system according to an embodiment of the present disclosure.

FIG. 10 shows a schematic diagram of the interaction or connection relationship between each controller 6 and another apparatus or component of the light-field display system. One controller 6 controls at least one lamp panel 10111. In addition, the light-field display system may further include a power supply system, which is responsible for providing a stable power supply for a mechanical rotation system, the server, the lamp panel controller 6, and the lamp panel.

The light-field display system further includes a viewing platform 9 configured to provide a viewing position with a better viewing angle for a viewer. According to an application scenario of the rotatable display screen, when the viewing platform 9 needs to be disposed, a position of the viewing platform 9 may be determined to be inside or outside the cylindrical display screen according to a direction in which the display screen displays an image.

Figure 11:
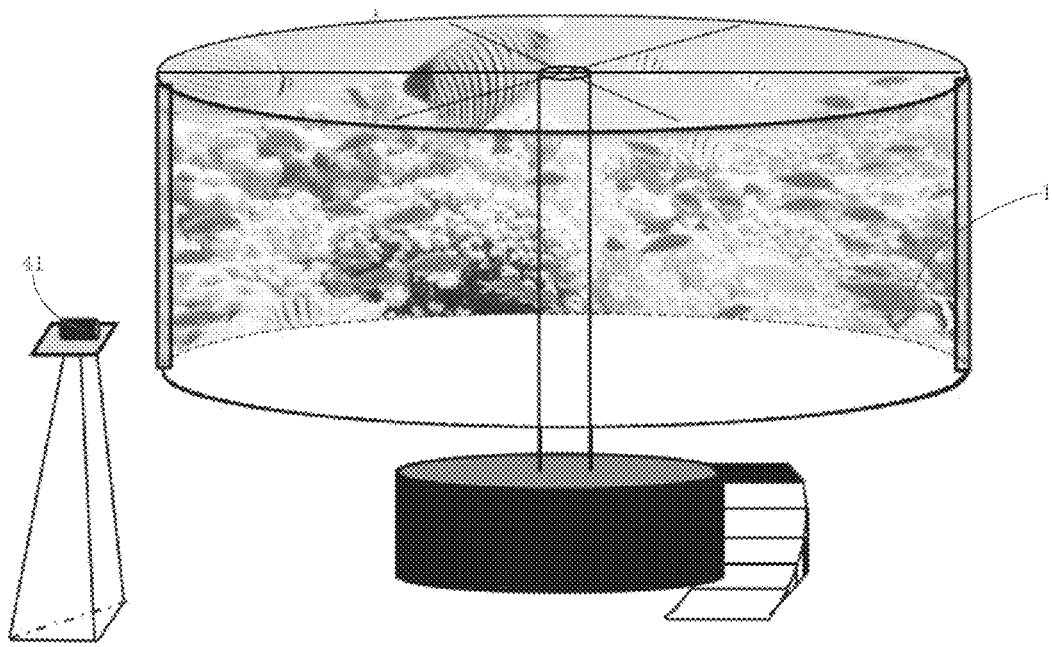
FIG. 11 is a schematic diagram of a light-field display system displaying an image according to an embodiment of the present disclosure.
Figure 12:
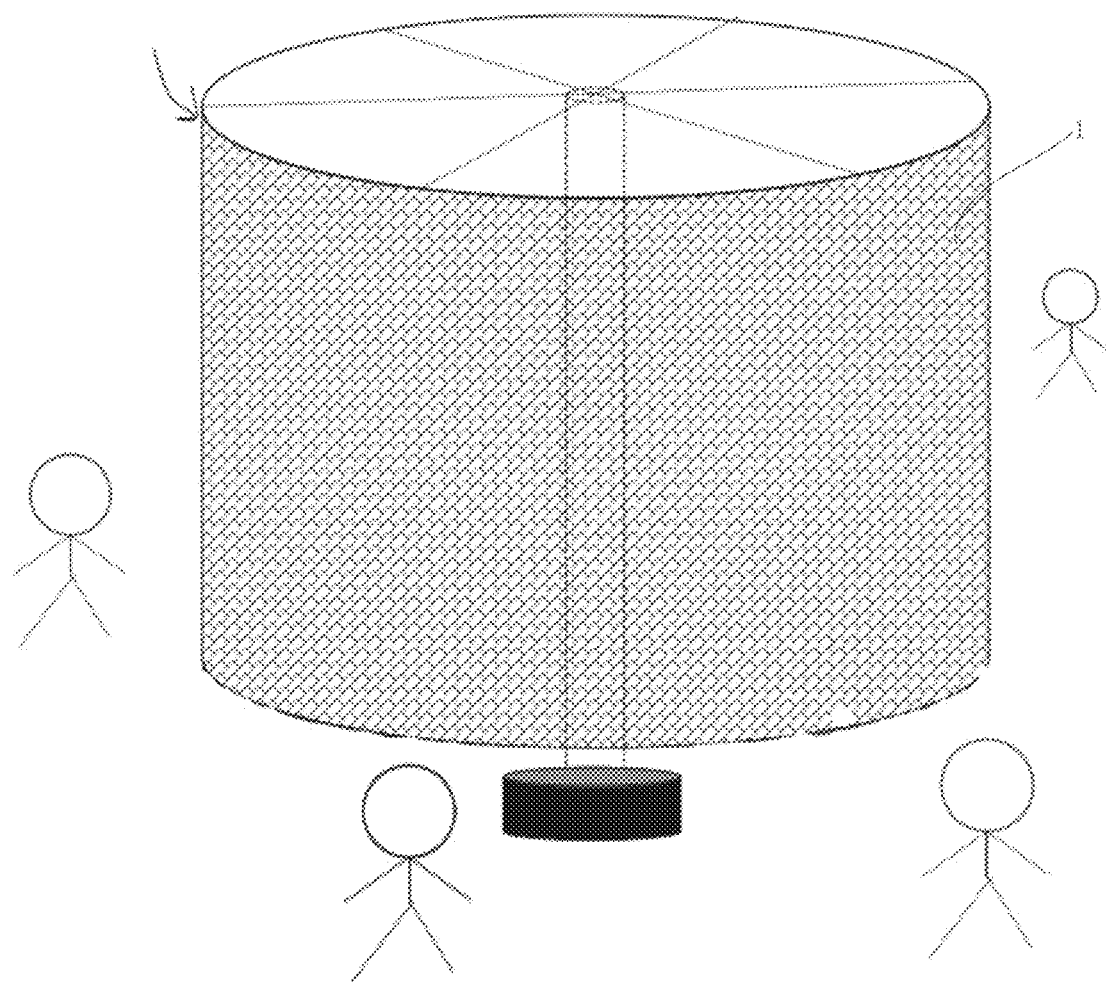
FIG. 12 is a schematic diagram of a viewing platform disposed on an outer side of a display screen according to an embodiment of the present disclosure.

For the light-field display system shown in FIG. 1, the viewing platform 9 is disposed inside the rotatable display screen. When an image is displayed, a schematic diagram is shown in FIG. 11. In one implementation, a viewer may view displayed content from the outside of the rotatable display screen. When the viewing platform 9 needs to be disposed, the viewing platform 9 may be disposed at an appropriate position outside the display system as shown in FIG. 12 to provide viewing convenience for a viewer.

Figure 13:
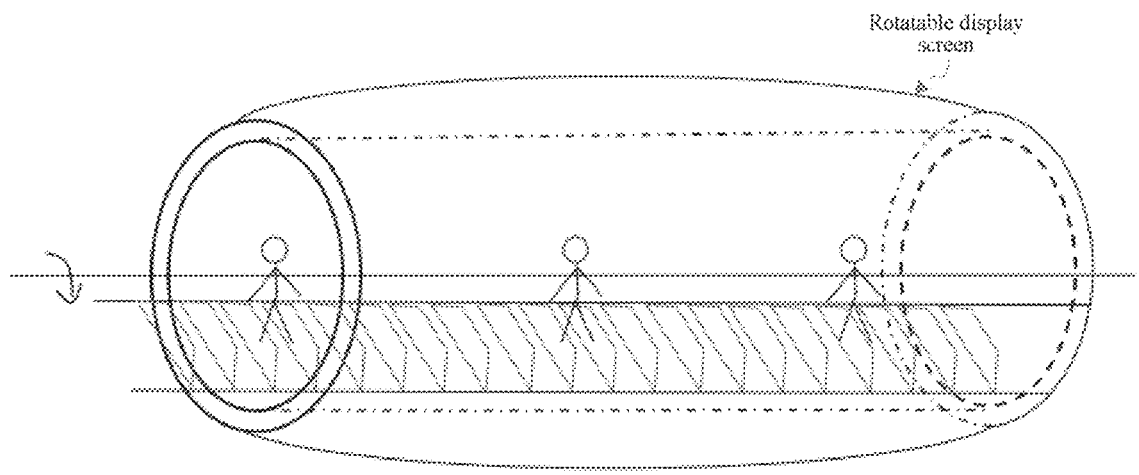
FIG. 13 is a schematic diagram of a display system according to an embodiment of the present disclosure when a lamp panel is horizontally placed.

In one implementation, the lamp pole 101 can be placed horizontally so that round steel hoops that fix the lamp pole 101 are a left round steel hoop and a right round steel hoop. A rotation center shaft of the rotatable display screen subsystem 1 is a horizontal shaft. This is shown in the light-field display system of FIG. 13. In one implementation, the rotatable display screen is a planar display screen system instead of a curved-surface screen such as a cylindrical screen. In the light-field display system, the lamp pole fixing apparatus includes at least one second rotation center shaft 102 and at least one display lamp stand 10. In one implementation, the lamp pole 101 includes a light-emitting portion 1011 on which a vector pixel is disposed and a rotating portion on which no vector pixel is disposed, where one end of the rotating portion is fixed on the second rotation center shaft 102 and is driven by the motor to rotate with the second rotation center shaft 102 as a center. In one implementation, the rotatable display screen subsystem 1 further includes a compensation lamp stand 20 disposed on a plane different from that of the lamp pole 101 that rotates with the second rotation center shaft 102 as a center. At least one compensation lamp pole 202 is disposed on the compensation lamp stand 20 and the at least one compensation lamp pole 202 is configured to compensate for a light emission gap of the rotating portion.

Figure 14:
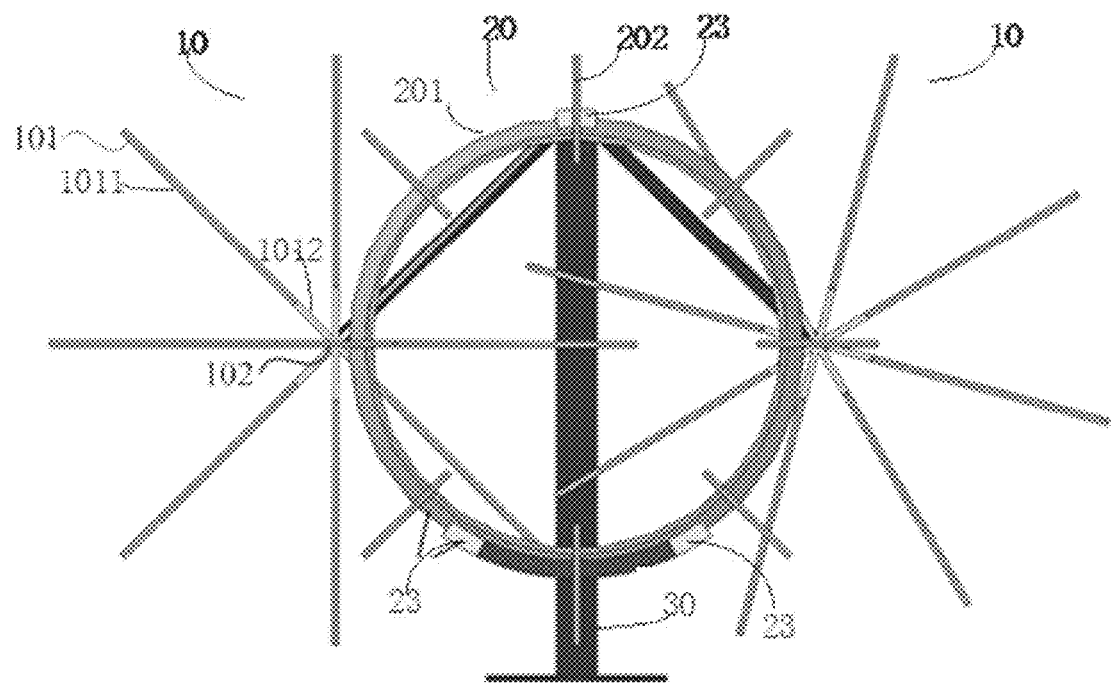
FIG. 14 is a schematic structural diagram of a light-field display system according to an embodiment of the present disclosure when a display screen is a planar structure.

FIG. 14 shows two display lamp stands 10. The two display lamp stands 10 include a total of 16 display lamp poles (e.g., lamp poles 101), respectively forming two double-cross-shaped structures The two display lamp stands 10 further include a rotating shaft (e.g., the second rotation center shaft 102), where the display light poles is fixedly disposed on the rotating shaft and is driven by the motor to rotate around the rotating shaft. The display lamp pole includes a light-emitting portion 1011 on which at least one lamp panel 10111 is disposed, where at least one vector pixel is disposed on the lamp panel 10111. The display lamp also includes a rotating portion 1012 on which no display lamp panel 10111 is disposed, where the rotating portion 1012 is close to a rotation center. The light-emitting portion 1011 is far away from the rotation center and the rotation center is a position at which the display lamp pole is fixed onto the rotating shaft. The vector pixel includes at least one vector subpixel, where the vector subpixel emits a light ray at a preset angle. Two display lamp stands 10 are disposed in the same horizontal plane. That is, all display lamp poles are in the same horizontal plane. An advantage of such disposition is to avoid the two display lamp stands 10 that are not in the same horizontal plane from causing a user to view a gap between two lamp poles 101 resulting in poor user experience.

In a working process of the display lamp stand 10, because the rotating portion 1012 cannot display an image, there is a no-image region in a planar display screen. To overcome this problem, a compensation lamp stand 20 is disposed. The compensation lamp stand 20 includes a lamp holder 201 and at least one compensation lamp pole 202. The compensation lamp pole 202 is fixed on the lamp holder 201, and one end of the compensation lamp pole 202 points to a center of a circle of the lamp holder 201. The compensation lamp stand 20 may be understood as a lamp stand used to compensate for the rotating portion 1012 of the display lamp stand 10. In other words, the compensation lamp stand 20 is configured to compensate for the rotating portion 1012, on which no vector pixel is disposed, of the display lamp stand. In FIG. 14, there are eight compensation lamp poles 202, disposed on the lamp holder 201 at intervals of a preset angle 45°.

The light-field display system further includes a support 30. The two display lamp stands 10 and the compensation lamp stand 20 are disposed in two different parallel planes. A plane in which the compensation lamp stand 20 is disposed has a shorter distance to a viewing side. The rotating shaft is fixedly mounted on the support 30. In an application process, to make the compensation lamp stand 20 cover the rotating portion of the display lamp stand 10 as much as possible, the compensation lamp pole 202 can be as long as possible length to cover the rotating portion.

When the compensation lamp stand 20 is fixed, a geometric center of a plane in which the compensation lamp stand 20 is located can be on the same straight line as a midpoint of a connecting line of a rotation center of the display lamp stand 10. The straight line is perpendicular to the two planes. An advantage of such disposition is that when the two display lamp stands 10 and the compensation lamp stand 20 rotate, the compensation lamp stand 20 covers the rotating portions of the display lamp stands 10 so that a user can see the complete display screen. When a large-size display screen is needed, a quantity of display lamp stands and a quantity of compensation lamp stands can be increased correspondingly to achieve a corresponding effect.

In one implementation, a driving mechanism adopted to drive the compensation lamp stand 20 is magnetic levitation. To drive the compensation lamp stand 20, at least three magnets 23 are included. The at least three magnets may be divided into two parts. One is to drive the lamp holder 201 of the compensation lamp stand to move, and the other is to adjust the adjust compensation lamp stand 20. In some examples, the compensation lamp stand 20 may alternatively be driven by a mechanical driving wheel.

It should be noted that in a case of the same resolution, a light-field display system using a vector pixel can make light emitted by the display screen have directivity. The vector pixel has a larger depth of field than that of an ordinary pixel. This effectively increases a display depth of a real image so that a viewer can see farther from the same position than before while an image is still clear, thereby alleviating a VAC effect to some extent. For example, a depth of field of a vector pixel with an organic light-emitting diode as a light source is compared with that of an ordinary pixel to indicate that the vector pixel can improve the depth of field. In one implementation, a 4 mm small hole was added in front of an experimental camera to imitate an eye. Vector pixel formed by an optical component and an ordinary pixel of an ordinary display screen are respectively shot to obtain sizes of light spots of the pixels in images photographed by the camera when the camera focuses on different planes. During the shooting, sizes of the displayed vector pixel and the ordinary pixel are kept the same.

In addition, because the vector pixel makes a size of a light spot projected to the eye small (even smaller than a size of the pupil), a depth of field can be effectively increased when a viewer is very close to the screen to overcome the VAC effect. Specifically, because the vector pixel emits sharp light which is a light beam that is efficiently narrow, when a viewer is very close to the screen, a size of a light spot projected into an eye is much smaller than a size of the pupil of the eye. Thus, the emitted light beam produces a pinhole imaging effect in the pupil of the eye. The above is equivalent to zooming out a camera and increasing a depth of field and relaxing a position at which eyes focus from a near position to a far position. This effectively prolongs a viewing distance so that all scenes viewed from near to far are clear. Production of a vector pixel increases a depth of field. In other words, the present disclosure can be used to provide an original screen with a larger space to add virtual display layers with different focal lengths to thereby resolve the VAC problem and achieve light field display with a single layer.

In addition, in the light-field display system of the present disclosure, the eye tracking subsystem and the lamp panel controller can be used to provide display simultaneously in a plurality of directions and support a plurality of people to use the light-field display system simultaneously without interference. Because there are many point light sources with the point light sources having small light beam angles and high angular resolution, projecting different corresponding pieces of content to different eyes in different directions can be supported. Viewing of a plurality of people in a moving state is supported. Eyes at different positions and different angles in a space all can be taken care of and can be enabled to see a realistic scene. It can be ensured that people can see different things without interfering with each other provided that regions do not overlap.

In the light-field display system of the present disclosure, vector pixels can be made to have different focal distance specifications, thereby achieving display in different focal planes. A plurality of layers of pixels with different focal planes can all be arranged on a same apparatus to achieve display with different depths of field and achieve a light field display effect. Production of the vector pixels can be used to choose to arrange display lamp poles sparsely, which is equivalent to further adding one or more groups of lamp poles to achieve simultaneous display of two or more displays. A focal length of each layer of display is adjustable and controllable by using an optical imaging device and a chip driver.

In one implementation, the vector pixel is formed by integrating and packaging a dense light-emitting device and an optical component. A distance between the dense light-emitting device and the optical component causes the vector pixel to be a real image vector pixel when an image of the dense light-emitting device is an real image. The distance between the dense light-emitting device and the optical component causes the vector pixel to be a virtual image vector pixel when the image of the dense light-emitting device is a virtual image. The dense light-emitting device includes a second preset quantity of micro light-emitting diode arrays or organic light-emitting diode arrays and the optical component includes a diaphragm. In one implementation, the real image vector pixels and virtual image vector pixels in the vector pixel array are alternately arranged on the lamp panel in a unit of column.

In one implementation, the vector pixel is formed by integrating and packaging the dense light-emitting device and the optical component The optical component includes the diaphragm and an arrangement gap between the vector pixels is less than one half of a difference between a pupil diameter of a viewer and a diameter of the diaphragm in the optical component. This causes parallel light emitted from optical centers of at least two vector pixels to be simultaneously incident onto pupils of a viewer facing the rotatable display screen subsystem.

In one implementation, the vector pixel is formed by integrating and packaging a dense light-emitting device and an optical component The vector pixel array further includes an image point-free vector pixel. A distance between a dense light-emitting device and an optical component of the image point-free vector pixel prevents light emitted from the dense light-emitting device from converging to form an image and the optical component includes a diaphragm.

In one implementation, the rotatable display screen subsystem includes the lamp pole, a lamp pole fixing apparatus, and the at least one controller. The lamp pole fixing apparatus include a first rotation center shaft, a cantilever, a diagonal brace, and a fixing ring configured to fix the lamp pole. A plurality of lamp poles are disposed, where each lamp pole is formed by combining a third preset quantity of lamp panels and the at least one controller through the diagonal brace. The plurality of lamp poles form a display screen of the rotatable display screen subsystem.

In one implementation, a plurality of first fixing points are disposed on each lamp panel. A same quantity of second fixing points to that of the first fixing points on the lamp panel are disposed on each diagonal brace. Each lamp panel and the diagonal brace are fixed through the corresponding first fixing points and second fixing points.

In one implementation, each lamp pole in the all lamp panels are placed in a same orientation and all the lamp panels have a consistent arrangement of a vector pixel array. In one implementation, the plurality of lamp poles are evenly arranged and fixed through the fixing ring. In one implementation vector pixels in odd-number columns of lamp poles and vector pixels in even-number columns of lamp poles are alternately arranged.

In one implementation, the rotatable display screen subsystem includes the lamp pole, a lamp pole fixing apparatus, and the at least one controller. The lamp pole fixing apparatus includes at least one second rotation center shaft and at least one display lamp stand.

In one implementation, the lamp pole includes a light-emitting portion on which a vector pixel is disposed and a rotating portion on which no vector pixel is disposed. One end of the rotating portion is fixed on the second rotation center shaft and is configured to rotate with the second rotation center shaft as a center.

In one implementation, the rotatable display screen subsystem further includes a compensation lamp stand. The compensation lamp stand is disposed on a plane different from that of the lamp pole that rotates with the second rotation center shaft as a center. At least one compensation lamp pole is disposed on the compensation lamp stand and is configured to compensate for a light emission gap of the rotating portion.

In one implementation, a plurality of preset positions on the periphery of the rotatable display screen subsystem are set to be positions unevenly arranged on a periphery of a display screen. The display screen is formed by a plurality of lamp poles. In one implementation, the light-field display system further includes a viewing platform configured to provide a viewing position for a viewer.

In the embodiments of the present disclosure, a lamp pole having a vector pixel array including a real image vector pixel and a virtual image vector pixel and structures (such as a lamp pole fixing apparatus, a controller, and a motor) are used to build a rotatable display screen subsystem. Specifically, a lamp panel including a vector pixel array and connecting and fixing apparatuses (such as a center shaft, a cantilever, and a diagonal brace) are used to build a rotatable display screen subsystem. The subsystem implements lamp panel positioning under the control of a lamp panel controller. The subsystem obtains positioning data of eye tracking and 3D display data and determines a light-emitting direction and light-emitting intensity of a light-emitting device in each vector pixel. The subsystem achieves glasses-free 3D display in a rotation process to thereby resolve the problems of low image resolution, small depth of field, limited motion parallax, small viewing angle, and limited application range of glasses-free 3D display. As a result, the subsystem allows a plurality of people to view a glasses-free 3D image at the same time and allow viewers at different viewing positions to see different 3D image content. This improves resolution and a depth of field of the glasses-free 3D image and broadens a viewing angle range for the viewers.

What is claimed is:

1. A light-field display system, comprising:
   a rotatable display screen subsystem including a lamp pole, the lamp pole including a plurality of lamp panels with each lamp panel having a vector pixel array and a vector pixel drive circuit, each vector pixel in the vector pixel array including a dense light-emitting device comprising a plurality of micro light-emitting diode arrays;
   a display screen positioning apparatus including a plurality of lasers and a photosensor, the plurality of lasers disposed a periphery of the rotatable display screen subsystem, the photosensor configured to collect sensed data; and
   one or more processors coupled to the rotatable display screen subsystem and the display screen positioning apparatus;
   wherein the one or more processors configured to:
      generate 3D display data to be displayed;
      determine a position of at least one lamp panel of the plurality of lamp panels based upon the sensed data;
      determine a subset of 3D display data from the 3D display data for one lamp panel of the plurality of lamp panels based at least in part upon an arrangement of the plurality of lamp panels; and
      determine display content and display direction of one or more vector pixels in the vector pixel array of the one lamp panel of the plurality of lamp panels based upon the subset of 3D display data; and
      drive the one or more vector pixels in the vector pixel array of the one lamp panel of the plurality of lamp panels to display the display content in the display direction.

2. The light-field display system of claim 1, wherein the each vector pixel in the vector pixel array further includes an optical component having a diaphragm.

3. The light-field display system of claim 2, wherein a first set of vector pixels in the vector pixel array determined to be real image vector pixels based on a distance between a respective dense light-emitting device and a respective optical component, wherein a second set of vector pixels in the vector pixel array determined to be virtual image vector pixels based on a distance between a respective dense light-emitting device and a respective optical component.

4. The light-field display system of claim 3, wherein the first set of vector pixels and the second set of vector pixels in the vector pixel array are alternately arranged on a lamp panel.

5. The light-field display system of claim 2, wherein an arrangement gap between two adjacent vector pixels in the vector pixel array is less than one half of a difference between a pupil diameter of a viewer and a diameter of the diaphragm in the optical component.

6. The light-field display system of claim 2, wherein:
   the vector pixel array further comprises an image point-free vector pixel;
   wherein a distance between a dense light-emitting device of the image point-free vector pixel and an optical component of the image point-free vector pixel prevents light emitted from the dense light-emitting device from converging to form an image.

7. The light-field display system of claim 1, wherein:
   the rotatable display screen subsystem further includes a lamp pole fixing apparatus to fix the lamp pole, the lamp pole fixing apparatus having a first rotation center shaft, a cantilever, a diagonal brace, and a fixing ring.

8. The light-field display system of claim 1, wherein:
   the lamp pole comprises a light-emitting portion on which the vector pixel array is disposed and a rotating portion on which no vector pixel is disposed; and
   one end of the rotating portion is fixed on a second rotation center shaft and configured to rotate around the second rotation center shaft.

9. The light-field display system of claim 8, wherein:
   the rotatable display screen subsystem further includes a compensation lamp stand disposed on a plane different from a plane of the lamp pole; and
   at least one compensation lamp pole is disposed on the compensation lamp stand and configured to compensate for a light emission gap caused by the rotating portion of the lamp pole.

10. The light-field display system of claim 1, further comprising:
   an eye tracking subsystem including an eye tracking camera and a position calculation unit, the eye tracking camera being configured to obtain image information, the position calculation unit being configured to determine spatial positions and line-of-sight directions of two eyes of a viewer according to the image information obtained by the eye tracking camera;
   wherein the one or more processors are further configured to:
      receive the spatial positions and the line-of-sight directions of the two eyes of the viewer;

generate the 3D display data based at least in part upon the spatial positions of the two eyes of the viewer; and determine the display content and the display direction of the one or more vector pixels in the vector pixel array of the one lamp panel of the plurality of lamp panels based upon the 3D display data and the spatial positions and the line-of-sight directions of the two eyes of the viewer.

11. A light-field display system, comprising:

a rotatable display screen subsystem including a lamp pole, the lamp pole including a plurality of lamp panels with each lamp panel having a vector pixel array and a vector pixel drive circuit;

an eye tracking subsystem including an eye tracking camera and a position calculation unit, the eye tracking camera being configured to obtain image information, the position calculation unit being configured to determine spatial positions and line-of-sight directions of two eyes of a viewer based upon the image information obtained by the eye tracking camera;

one or more processors coupled to the rotatable display screen subsystem and the display screen positioning apparatus;

wherein the one or more processors configured to:
 receive the spatial positions and the line-of-sight directions of the two eyes of the viewer;
 generate 3D display data based at least in part upon the spatial positions of the two eyes of the viewer; and
 determine display content and display direction of one or more vector pixels in the vector pixel array of the one lamp panel of the plurality of lamp panels based upon the 3D display data and the spatial positions and the line-of-sight directions of the two eyes of the viewer; and
 drive the one or more vector pixels in the vector pixel array of the one lamp panel of the plurality of lamp panels to display the display content in the display direction.

12. The light-field display system of claim 11, wherein each vector pixel in the vector pixel array is formed by a dense light-emitting device and an optical component having a diaphragm, wherein the dense light-emitting device includes a plurality of micro light-emitting diode arrays or a plurality of organic light-emitting diode arrays.

13. The light-field display system of claim 12, wherein a first set of vector pixels in the vector pixel array determined to be real image vector pixels based on a distance between a respective dense light-emitting device and a respective optical component, wherein a second set of vector pixels in the vector pixel array determined to be virtual image vector pixels based on a distance between a respective dense light-emitting device and a respective optical component.

14. The light-field display system of claim 13, wherein the first set of vector pixels and the second set of vector pixels in the vector pixel array are alternately arranged on a lamp panel.

15. The light-field display system of claim 12, wherein an arrangement gap between two adjacent vector pixels in the vector pixel array is less than one half of a difference between a pupil diameter of a viewer and a diameter of the diaphragm in the optical component.

16. The light-field display system of claim 12, wherein:
 the vector pixel array further comprises an image point-free vector pixel;
 wherein a distance between a dense light-emitting device of the image point-free vector pixel and an optical component of the image point-free vector pixel prevents light emitted from the dense light-emitting device from converging to form an image.

17. The light-field display system of claim 11, wherein:
 the rotatable display screen subsystem further includes a lamp pole fixing apparatus to fix the lamp pole, the lamp pole fixing apparatus having a first rotation center shaft, a cantilever, a diagonal brace, and a fixing ring.

18. The light-field display system of claim 11, wherein:
 the lamp pole comprises a light-emitting portion on which the vector pixel array is disposed and a rotating portion on which no vector pixel is disposed; and
 one end of the rotating portion is fixed on a second rotation center shaft and configured to rotate around the second rotation center shaft.

19. The light-field display system of claim 18, wherein:
 the rotatable display screen subsystem further includes a compensation lamp stand disposed on a plane different from a plane of the lamp pole; and
 at least one compensation lamp pole is disposed on the compensation lamp stand and configured to compensate for a light emission gap caused by the rotating portion of the lamp pole.

20. A method of generating 3D display images using a light-field display system comprising a plurality of lamp panels and one or more processors, the method comprising:
 generating 3D display data to be displayed;
 determining a position of at least one lamp panel of the plurality of lamp panels based upon sensed data, the sensed data collected by a photosensor;
 determining a subset of 3D display data from the 3D display data for one lamp panel of the plurality of lamp panels based at least in part upon an arrangement of the plurality of lamp panels;
 obtaining, by an eye tracking system, image information;
 determining spatial positions and line-of-sight directions of two eyes of a viewer based upon the image information; and
 determining display content and display direction of one or more vector pixels in a vector pixel array of the one lamp panel of the plurality of lamp panels based upon the subset of 3D display data and the spatial positions and the line-of-sight directions of two eyes of a viewer; and
 driving the one or more vector pixels in the vector pixel array of the one lamp panel of the plurality of lamp panels to display the display content in the display direction.

* * * * *